United States Patent
Huang et al.

(10) Patent No.: US 8,547,485 B2
(45) Date of Patent: *Oct. 1, 2013

(54) SYSTEMS AND METHODS FOR CHANNEL SCANNING

(75) Inventors: Chien-Ming Huang, Chu-Pei (TW); Ching-Chieh Wang, Luodong Township, Yilan County (TW); Hua Wu, Jhubei (TW)

(73) Assignee: Mediatek Inc., Hsin-Chu (TW)

( * ) Notice: Subject to any disclaimer, the term of this patent is extended or adjusted under 35 U.S.C. 154(b) by 23 days.

This patent is subject to a terminal disclaimer.

(21) Appl. No.: 13/324,170

(22) Filed: Dec. 13, 2011

(65) Prior Publication Data

US 2012/0081610 A1    Apr. 5, 2012

Related U.S. Application Data

(63) Continuation of application No. 11/745,602, filed on May 8, 2007, now Pat. No. 8,102,474.

(51) Int. Cl.
*H04N 5/50*    (2006.01)

(52) U.S. Cl.
USPC ......................................... 348/731; 348/732

(58) Field of Classification Search
USPC .............. 348/731–733, 725–728; 455/179.1, 455/182.3, 185.1, 192.3
IPC .................................... H04N 5/50, 5/44, 5/455
See application file for complete search history.

(56) References Cited

U.S. PATENT DOCUMENTS

| | | | |
|---|---|---|---|
| 6,118,498 | A | 9/2000 | Reitmeier |
| 7,380,263 | B2 | 5/2008 | Shintani |
| 2004/0261116 | A1 | 12/2004 | Mckeown et al. |
| 2008/0225182 | A1 | 9/2008 | Silver et al. |

FOREIGN PATENT DOCUMENTS

| | | |
|---|---|---|
| CN | 1302506 | 7/2001 |
| CN | 1902914 | 1/2007 |

*Primary Examiner* — Sherrie Hsia
(74) *Attorney, Agent, or Firm* — McClure, Qualey & Rodack, LLP

(57) ABSTRACT

Methods for channel scanning are provided. An embodiment of a method for channel scanning comprises scan progress information stored when interrupting a channel scanning process. A carrier RF subsequent to the most recently processed carrier RF is locked onto with reference to the stored scan progress information when resuming the interrupted channel scanning process. Channel information of a program carried by the locked carrier RF is acquired. The acquired channel information of the program is stored in a channel table.

19 Claims, 10 Drawing Sheets

| video PES[1] of program[1] | video PES[2] of program[1] | audio PES[1] of program[1] | subtitle PES[1] of program[1] | video PES[1] of program[2] | video PES[2] of program[2] | audio PES[1] of program[2] | subtitle PES[1] of program[2] |

FIG. 4

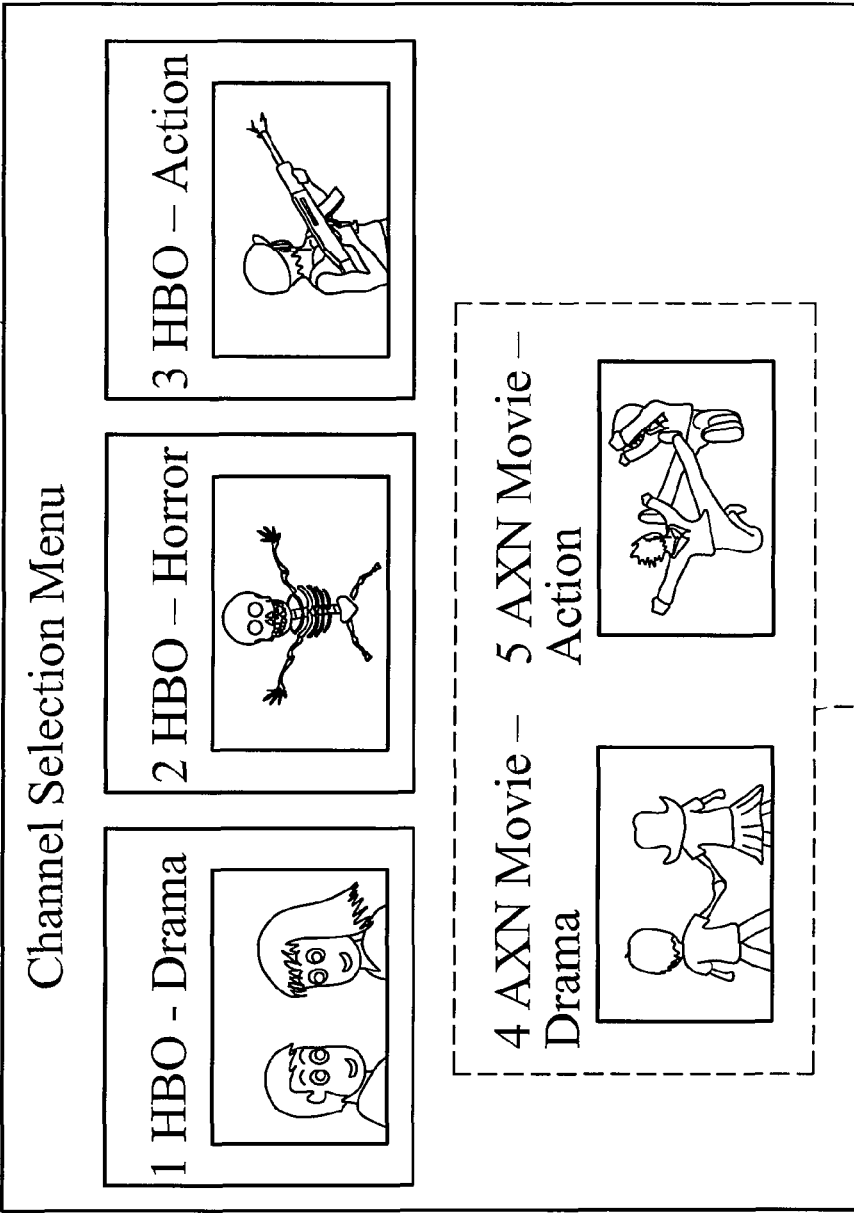

SYSTEMS AND METHODS FOR CHANNEL SCANNING

CROSS-REFERENCE TO RELATED APPLICATION

This application is a continuation of application Ser. No. 11/745,652, field May 8, 2007 (now U.S. Pat. No. 8,102,474), the entirety of which is incorporated herein by reference.

BACKGROUND

The invention relates to channel scanning, and more particularly, to systems and methods for channel scanning utilizing a single tuner and demodulator.

Televisions (TVs), set top boxes or portable media players (PMPs) are typically equipped with a channel scanning system to automatically search frequency bands carrying receivable signals and generate a channel list accordingly. A TV tuner may be directed to lock onto a particular frequency by switching to a channel in the channel list by a user. The channel scanning process is conducted to locate all receivable signals, and the corresponding frequencies are recorded in a channel table, however, this process may consume excessive time, which is inconvenient to the users, especially for the users carrying PMPs and traveling to different countries. In this case, the channel scanning process is frequently performed as each area or country has a different channel allocation.

SUMMARY

An embodiment of a method for channel scanning comprises scan progress information stored when interrupting a channel scanning process. A carrier RF subsequent to the interrupted carrier RF is locked onto with reference to the stored scan progress information when resuming the interrupted channel scanning process. Channel information of a channel carried by the locked carrier RF is acquired. The acquired channel information of the channel is stored in a channel table.

An embodiment of a method for channel scanning comprises a carrier RF being locked onto. A representative image or a series of representative video frames of a channel is acquired from a transport stream (TS) carried by the locked carrier RF. The representative image or video frames of the channel are stored in a channel table.

An embodiment of a system for channel scanning comprises a memory device, a tuner and demodulator, a demutiplexer (demux) packet identifier (PID) filter and a processing unit. The processing unit, coupling to the memory device, the tuner and demodulator, and the demux PID filter, stores scan progress information in the memory device when interrupting a channel scanning process, controls the tuner and demodulator to lock onto a carrier RF subsequent to the most recently processed carrier RF with reference to the stored scan progress information when resuming the interrupted channel scanning process, acquires channel information of a first channel carried by the locked carrier RF, and stores the acquired channel information of the first channel in a channel table of the memory device.

An embodiment of a system for channel scanning comprises a memory device, a tuner and demodulator, and a processing unit. The processing unit, coupling to the memory device, and the tuner and demodulator, acquires a representative image or a series of representative video frames of a channel from a TS carried by the locked carrier RF, and stores the representative image or video frames of the channel in a channel table of the memory device.

BRIEF DESCRIPTION OF DRAWINGS

The invention will become more fully understood by referring to the following detailed description with reference to the accompanying drawings, wherein:

FIG. 4 is a diagram of an exemplary transport stream (TS);

FIG. 6b is another exemplary channel selection menu in a grid matrix displayed on a display device.

DETAILED DESCRIPTION

Figure 1A:
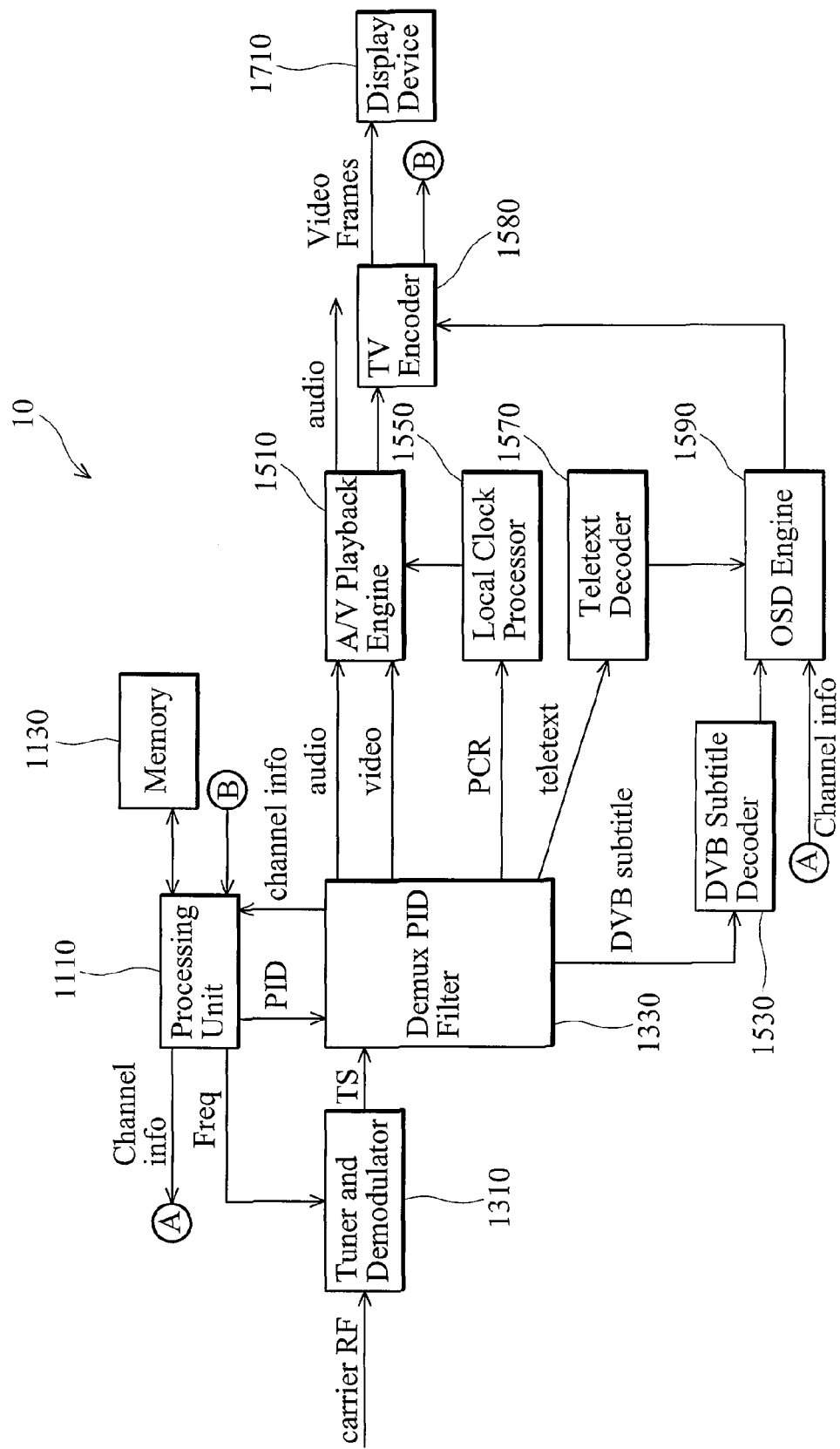
FIG. 1a is a block diagram applicable to an embodiment of a digital channel scanning system.

FIG. 1a is a diagram of an embodiment of a digital channel scanning system 10 comprising a processing unit 1110, memory 1130, a tuner and demodulator 1310, a demux PID (packet identification) filter 1330, a NV (audio/video) playback engine 1510, a subtitle decoder 1530 such as DVB (Digital Video Broadcasting) subtitle decoder, a local clock processor 1550, a teletext decoder 1570, a television (TV) encoder 1580, an OSD (on-screen display) engine 1590 and a display device 1710. The digital channel scanning system 10 may be installed in external TV boxes or set-top boxes, or in various display apparatuses such as CRT displays, plasma display panel (PDP) displays, liquid crystal displays (LCDs), organic light-emitting diode displays (OLEDs), and others. The memory 1130 may be a volatile storage device, nonvolatile storage device, or combination to store a channel table and program modules executed by the processing unit 1110. The processing unit 1110 loads and executes program modules, with the tuner and demodulator 1310, demux and PID filter 1330, memory 1130, OSD engine 1590 and the similar, to complete channel scanning. The tuner and demodulator 1310 lock on to a particular carrier radio frequency (RF), and convert modulated carrier waves into original baseband signals, e.g. MPEG transport stream (TS). The demux PID (packet identifier) filter 1330 reconverts the MPEG TS that contains several intermixed signals, such as video, audio, teletext, subtitle and PCR (program clock reference) signals and others, back into its original separate signals, and transfers the separated signals to relevant functional blocks, such as the A/V playback engine 1510, DVB subtitle decoder 1530, local clock processor 1550, teletext decoder 1570, or similar, for video display or audio amplify. The TV encoder 1580 generates a series of frames to be displayed with reference to video signals from the NV playback engine 1510 and OSD engine 1590. The display device 1710, such as a color super-twisted nematic (CSTN) display, a thin film transistor-liquid crystal display (TFT-LCD), an organic light-emitting diode (OLED) display or similar, may be an internal display device coupling to the TV encoder 1580 via buses, or an external display coupling to the TV encoder 1580 via wired cables or wireless connections.

Figure 1B:
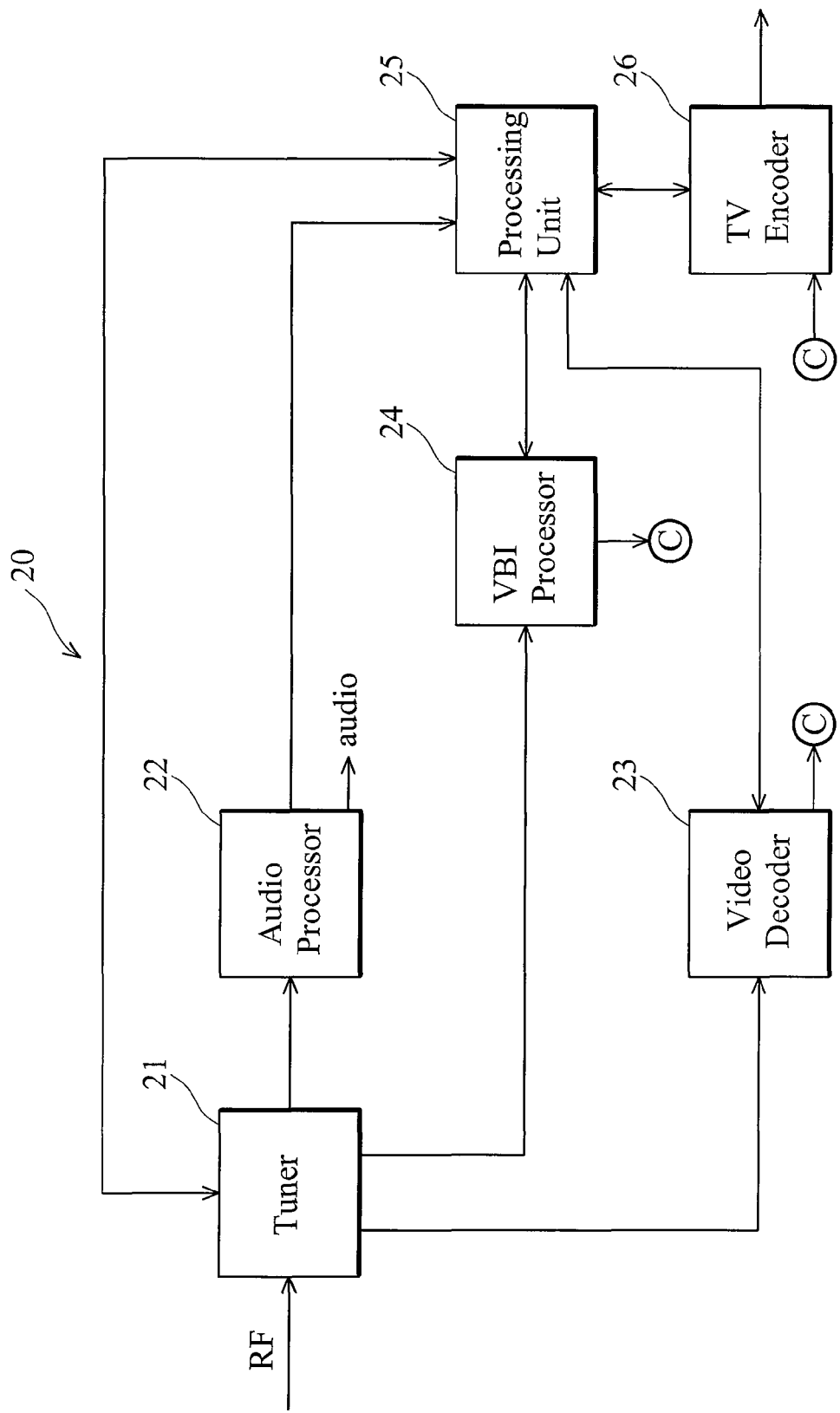
FIG. 1b is a block diagram applicable to another embodiment of an analog channel scanning system; [please add another figure (FIG. 1b) for analog system! please delete B, and draw a line to connect 1510 to 1110 (from 1510 to 1110)!]

FIG. 1*b* is a diagram of an embodiment of an analog channel scanning system 20, comprising a tuner 21, an audio processor 22, a video decoder 23, a teletext processor 24, a processing unit 25 and a TV encoder 26. The processing unit 25 loads and executes program modules, with the tuner 21, audio processor 22, video decoder 23 and vertical blanking interval (VBI) processor 24, to complete channel scanning. The tuner 21 locks on to a particular frequency and filters out video, audio or teletext signals for video display or audio amplify. The tuner 21 may first select a specific frequency such as 176.00 MHz, and detect whether the selected frequency carries video, audio or teletext signals capable of being displayed or played. If so, the tuner 21 locks on to the selected frequency. The TV encoder 26 generates a series of frames to be displayed with reference to video signals from the video decoder 23, and teletext signals from the VBI processor 24, and audio signals to be played from the audio processor 22.

Figure 2:
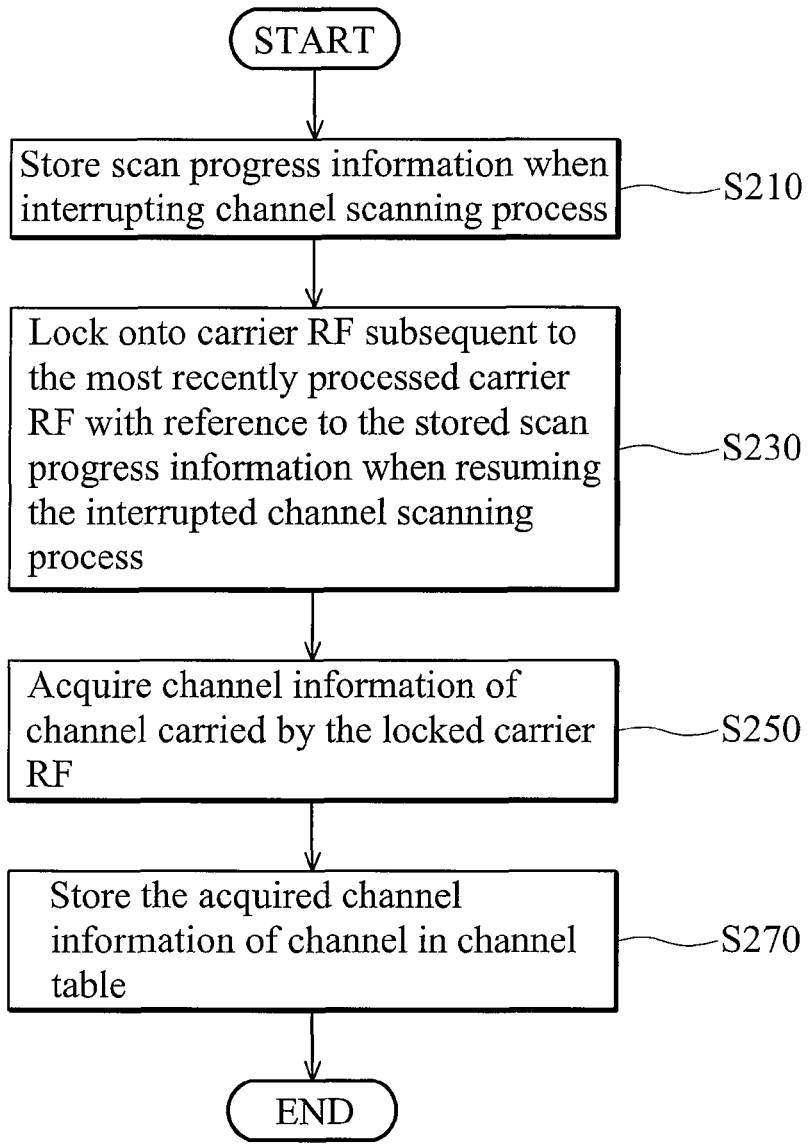
FIG. 2 is a channel scanning flowchart of the processing unit 1110 in FIG. 1 interrupted by users; [Jonah, please slightly modify the working of each step in the flowchart]

FIG. 2 is a flowchart illustrating a channel scanning process, executed by the processing unit 1110 (FIG. 1). In step S210, scan progress information is stored when interrupting a channel scanning process. In step S230, a carrier RF subsequent to the most recently processed carrier RF is locked onto with reference to the stored scan progress information when resuming the interrupted channel scanning process. In step S250, channel information of a program carried by the locked carrier RF is acquired. In step S270, the acquired channel information of the program is stored in a channel table. The channel table facilitates user to switch channels which have been detected by the channel scan process. It is to be understood that the channel scanning method may be utilized in scanning channels carried by both analog and digital TV signals, where the analog TV signals comprises NTSC (National TV Standards Committee), PAL (Phase Alternating Line), SECAM (SEquential Couleur Avec Memoire, Sequential Color with Memory), or similar, and the digital TV signals comprises DVB (digital video broadcasting) signals, ATSC signal, or similar.

Figure 3A:
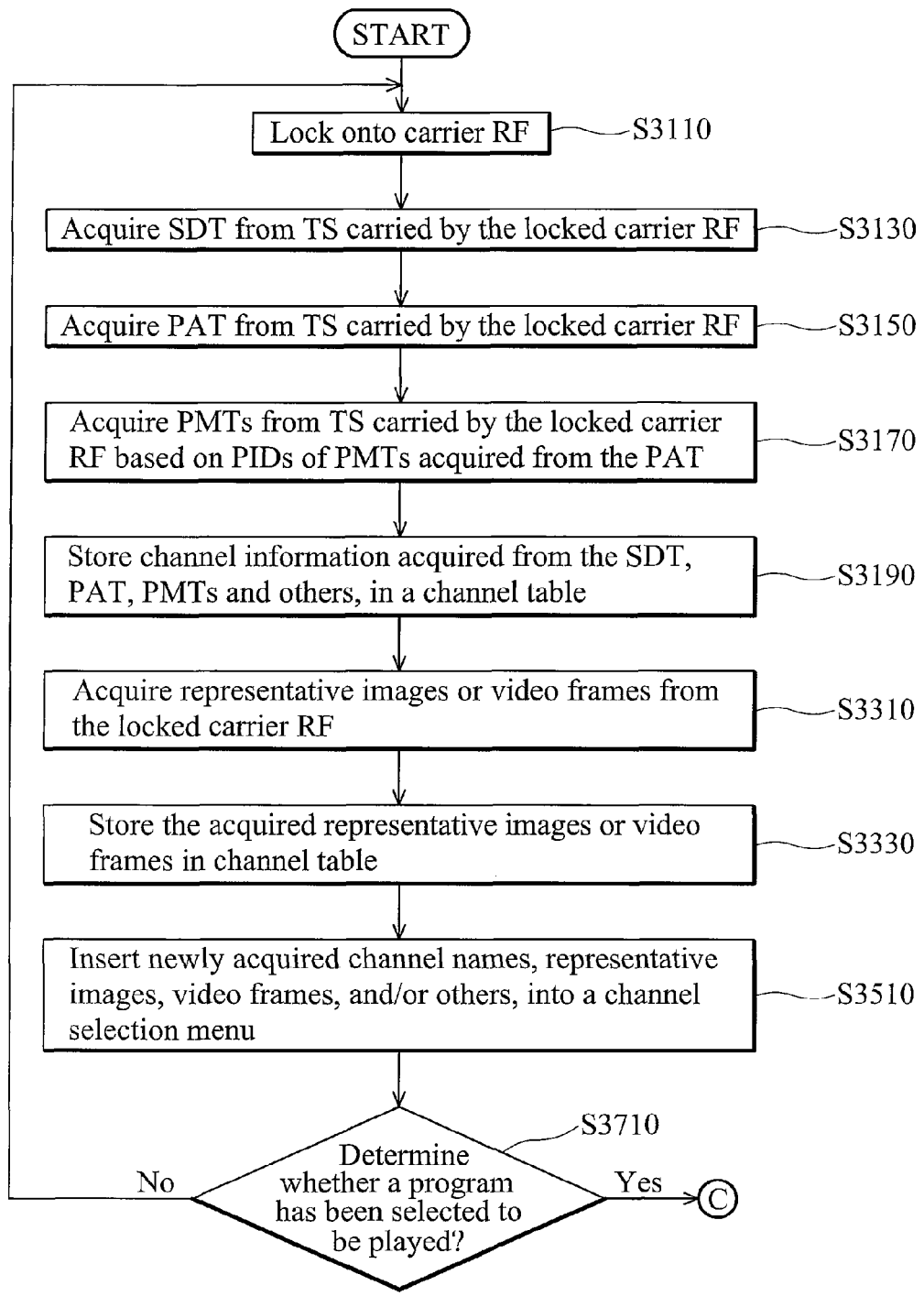
FIGS. 3a and 3b are flowcharts of an embodiment of a channel scanning process.

FIG. 3*a* is a flowchart illustrating a more detailed channel scanning process, executed by the processing unit 1110 (FIG. 1), according to an embodiment. The embodiment of the channel scanning method periodically locks on to a carrier RF, acquires channel information for several programs (i.e. virtual channels) carried by the locked carrier RF and stores the acquired channel information in volatile, nonvolatile storage device or combination, such as a hard disk, a flash memory, EEPROM, RAM or similar. In addition, the channel scanning method periodically detects whether a program is selected to be played. If so, the channel scanning method stops scanning, stores scan progress information regarding the most recently locked carrier RF, the most recently stored program, and/or others, thereby enabling resumption of the interrupted channel scanning according to the stored scan progress information, and configures relevant hardware circuits, such as the tuner and demodulator 1310 of FIG. 1, demux PID filter 1330 of FIG. 1, and others, to play the selected program. In step S3110, a carrier RF carrying MPEG TS is lock onto. Step S3110 may be periodically performed to lock onto carrier RFs carrying MPEG TSs via traditional terrestrial broadcast (digital video broadcasting—terrestrial, DVB-T), via satellite (digital video broadcasting—satellite, DVB-S) or cable (digital video broadcasting—cable, DVB-C). The MPEG TS comprises multiplexed MPEG-compressed audio, video, teletext, and/or subtitle streams for at least one program (also referred to as service defined in the DVB spec). Each stream been multiplexed in the TS is referred to as an elementary stream (ES). During multiplexing, each ES is divided into packetized element stream (PES) packets. These PES packets consist of two parts, the packet header (4 bytes) and the payload containing a portion of the ES data. FIG. 4 is a diagram of an exemplary TS containing PES packets for multiplexed MPEG-compressed audio, video and subtitle ESs for two programs. Specifically, the processing unit 1110 (FIG. 1) may control the tuner and demodulator 1310 (FIG. 1) to lock onto the next carrier RF carrying TV or radio signals capable of being played.

In step S3130, a service description table (SDT) is acquired from a TS carried by the locked carrier RF. The SDT contains information describing the services (i.e. programs or virtual channels) in the DVB system, such as channel names, service provider and others. The TS packets containing the SDTs have a PID (packet identifier) being "0x0011". The SDT may be segmented into service description sections using the syntax of table 1.

TABLE 1

Service description section

| Syntax | Number of bits | Identifier |
|---|---|---|
| service_description_section( ) { | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   transport_stream_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   original_network_id | 16 | uimsbf |
|   reserved_future_use | 8 | bslbf |
|   for (i=0;i<N;i++) { | | |
|     service_id | 16 | uimsbf |
|     reserved_future_use | 6 | bslbf |
|     EIT_schedule_flag | 1 | bslbf |
|     EIT_present_following_flag | 1 | bslbf |
|     running_status | 3 | uimsbf |
|     free_CA_mode | 1 | bslbf |
|     descriptors_loop_length | 12 | uimsbf |
|     for (j=0;j<N;j++) { | | |
|       descriptor( ) | | |
|     } | | |
|   } | | |
|   CRC_32 | 32 | rpchof |
| } | | |

The service_id is a 16-bit field which serves as a label to differentiate this service from any other service within the TS. The service_id is the same as the program_number in the program map section as follows. Service profile information, such as channel name, channel type, and others, is provided in various descriptors. Specifically, the processing unit 1110 (FIG. 1) may provide the PID "0x0011" to the demux PID filter 1330 (FIG. 1) in order to control the demux PID filter 1330 (FIG. 1) to filter out and reply with the SDT.

In a TS, several ESs are multiplexed together, each one identified by a PID (packet identifier). Moreover, ESs can be grouped together into programs (e.g. the ESs containing audio, video, teletext and subtitle data of a movie or a TV virtual channel). Two essential tables are carried in the TS, such as a program association table (PAT) and a program map table (PMT). The PAT lists all the programs in a TS. The TS packets containing the PATs have a PID being "0x0000". For each program, the PAT provides PIDs of TS Packets containing the PMT (each program has a unique PMT). Each PMT provides PIDs of PES packets containing audio, video, teletext, and/or subtitle ES data being part of a particular program. In step S3150, a PAT is acquired from a TS carried by the locked carrier RF. The PAT provides the correspondence between a program_number and the PID of the TS packets carrying the program definition. The program_number is the numeric label associated with a specific program. The PAT may be segmented into program association sections using the syntax of table 2.

TABLE 2

Program association section

| Syntax | Number of bits | Identifier |
|---|---|---|
| Program_association_section( ) { | | |
|   table_id | 8 | uimsbf |
|   section_syntax_indicator | 1 | bslbf |
|   '0' | 1 | bslbf |
|   reserved | 2 | bslbf |
|   section_length | 12 | uimsbf |
|   transport_stream_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   for (i=0;i<N;i++) { | | |
|     program_number | 16 | uimsbf |
|     reserved | 3 | bslbf |
|     if (program_number == '0') { | | |
|       network_PID | 13 | uimsbf |
|     } | | |
|     else { | | |
|       program_map_PID | 13 | uimsbf |
|     } | | |
|   } | | |
|   CRC_32 | 32 | rpchof |
| } | | |

The program_number is a 16-bit field, and specifies the program to which the program_map_PID is applicable. When set to "0x0000", the following PID value is the network PID. The program_map_PID is a 13-bit field specifying the PID of the TS packets containing the program map section applicable for the program as specified by the program_number. Specifically, the processing unit 1110 (FIG. 1) may provide the PID "0x0000" to the demux PID filter 1330 (FIG. 1) in order to direct the demux PID filter 1330 (FIG. 1) to filter out and reply with the PAT.

In step S3170, PMTs are acquired from a TS carried by the locked carrier RF based on PIDs of PMTs acquired from the PAT. Each PMT provides mappings between program numbers and program elements, such as audio, video, teletext, subtitle, PCR, and others. The PMT may be segmented into transport stream program map sections using the syntax of table 3.

TABLE 3

Transport stream program map section

| Syntax | Number of bits | Identifier |
|---|---|---|
| TS_program_map_section( ) { | | |
|   table_id | 8 | uimsbf |

TABLE 3-continued

Transport stream program map section

| Syntax | Number of bits | Identifier |
|---|---|---|
|   section_syntax_indicator | 1 | bslbf |
|   '0' | 1 | bslbf |
|   reserved | 2 | bslbf |
|   section_length | 12 | uimsbf |
|   program_number | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved | 3 | bslbf |
|   PCR_PID | 13 | uimsbf |
|   reserved | 4 | bslbf |
|   program_info_length | 12 | uimsbf |
|   for (i=0;i<N;i++) { | | |
|     descriptor( ) | | |
|   } | | |
|   for (I=0; i<N1; i++) { | | |
|     stream_type | 8 | uimsbf |
|     reserved | 3 | bslbf |
|     elementary_PID | 13 | uimsbf |
|     reserved | 4 | bslbf |
|     ES_info_length | 12 | uimsbf |
|     For(i=0;i<N2;i++){ | | |
|       descriptor( ) | | |
|     } | | |
|   } | | |
|   CRC_32 | 32 | rpchof |
| } | | |

The PCR_PID is a 13-bit field indicating the PID of the TS packets containing PCR fields valid for the program specified by program_number. The elementary_PID is a 13-bit field specifying the PID of the TS packets carrying the associated program element, such as video, audio, teletext, subtitle and others. The stream_type is an 8-bit field specifying the type of program element carried within the PES packets with the PID the value of which is specified by the elementary_PID. The details of the TS, PAT, PMT and PID may refer to specifications "ISO/IEC 13818-1, Information technology—Generic coding of moving pictures and associated audio: Systems" established Nov. 13, 1994, and "ESTI EN 300 468 V1.6.1, Digital Video Broadcasting (DVB); specification for Service Information (SI) in DVB systems" established October 1995. Specifically, the processing unit 1110 (FIG. 1) may provide PIDs of the detected PMTs to the demux PID filter 1330 (FIG. 1) in order to direct the demux PID filter 1330 (FIG. 1) to filter out and reply with the PMTs.

In step S3190, channel information, such as the TS ID, service ID, network ID, center frequency, PCR PID, elementary PIDs, channel name, channel type and others, for each program carried by the locked carrier RF is acquired from the SDT, PAT, PMTs and others, and is stored in a channel table. The channel table may be stored in the memory 1130 (FIG. 1) and represented by table 4.

TABLE 4

Channel table

| 1 | Transport stream ID |
| 2 | Service ID |
| 3 | Original network ID |
| 4 | Attribute (deleted, locked or scrambled) |
| 5 | Center Frequency |
| 6 | PCR PID |
| 7 | Video PID |

TABLE 4-continued

Channel table

| | |
|---|---|
| 8 | Audio PID |
| 9 | Subtitle PID |
| 10 | Teletext PID |
| 11 | Channel Name |
| 12 | Channel Type (DVB TV or radio mode) |
| 13 | Representative image |
| 14 | Representative video frames |

Note that, when the channel type of the scanned program is DVB radio mode, video, subtitle and teletext PIDs may be omitted.

In step S3310, representative images or video frames for the detected programs are acquired from the locked carrier RF. Specifically, for each detected program, the processing unit 1110 (FIG. 1) may provide video, subtitle, teletext and PCR PIDs of the program to the demux PID filter 1330 (FIG. 1) in order to direct the demux PID filter 1330 (FIG. 1) to filter out video, subtitle and/or teletext PES packets and provide the filtered video, subtitle and/or teletext PES packets to the A/V playback engine 1510 (FIG. 1), teletext decoder 1570 (FIG. 1) and/or DVB subtitle decoder 1530 (FIG. 1), and retrieve one video frame as a representative image or a series of frames as representative video frames from the TV encoder 1580 (FIG. 1). In step S3330, the acquired representative images or video frames are stored in the "Representative image" or "Representative video frames" fields of the channel table. Note that steps S3310 and S3330 may be omitted to improve channel scanning efficiency.

Figure 5A:
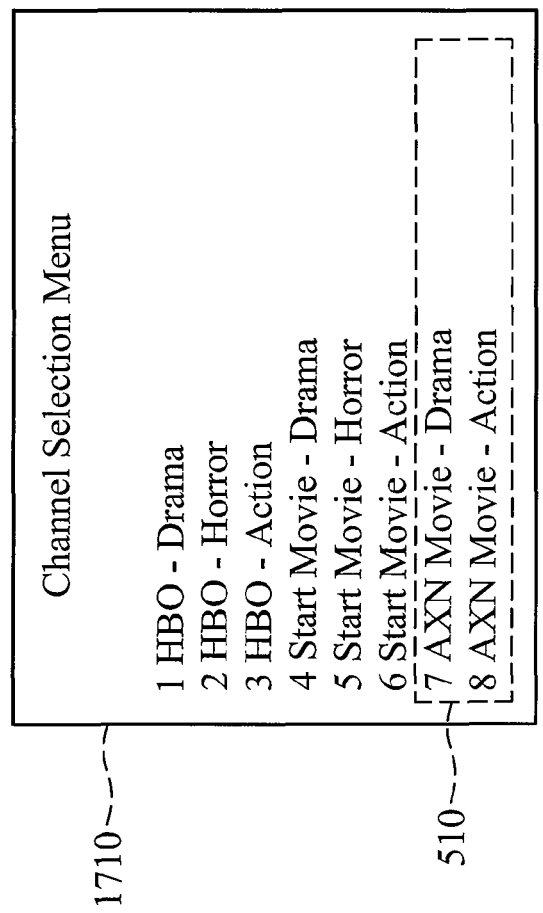
FIG. 5a is an exemplary channel selection menu in a top-down list displayed on a display device.
Figure 5B:
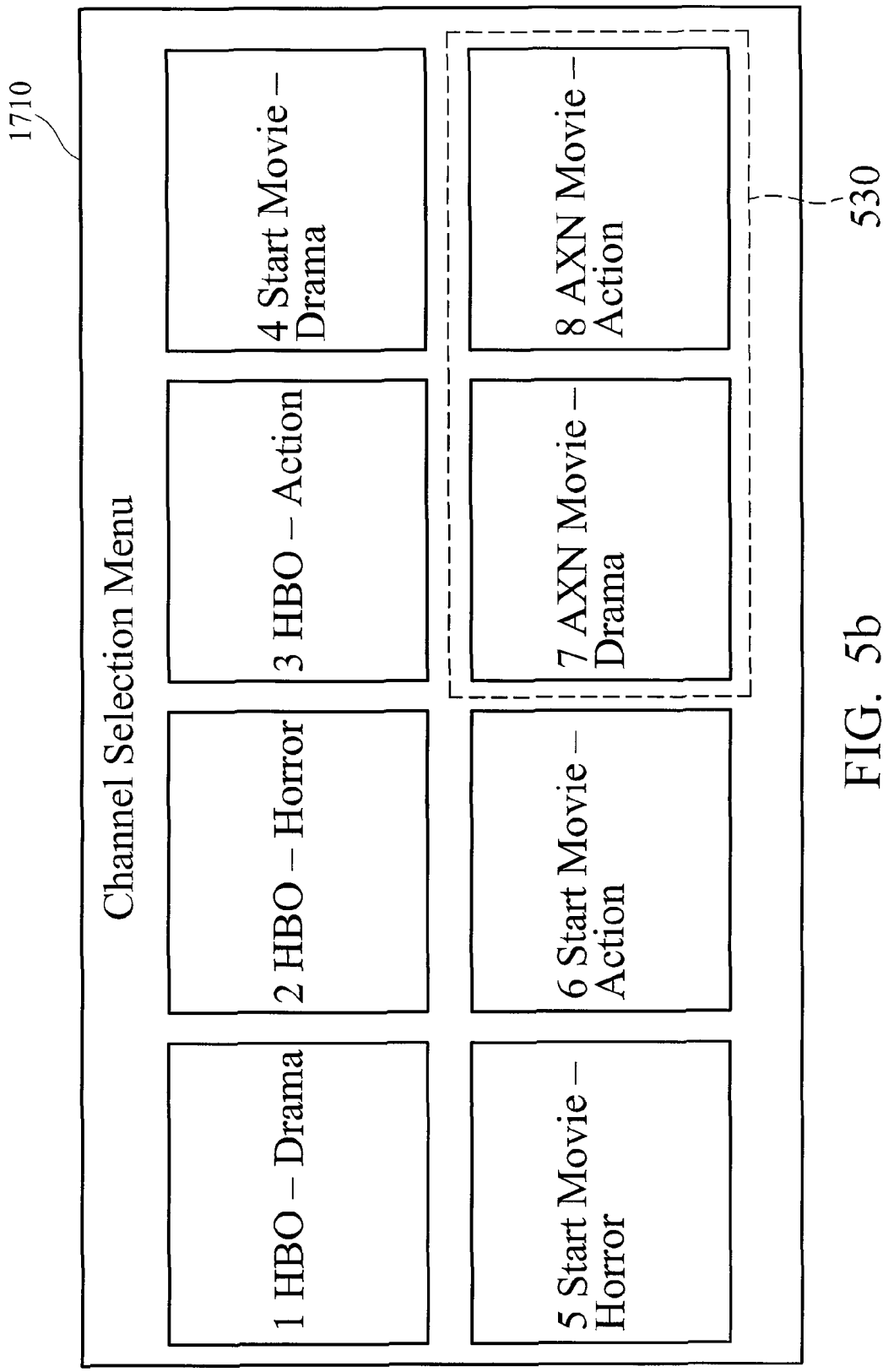
FIG. 5b is an exemplary channel selection menu in a grid matrix displayed on a display device.
Figure 6A:
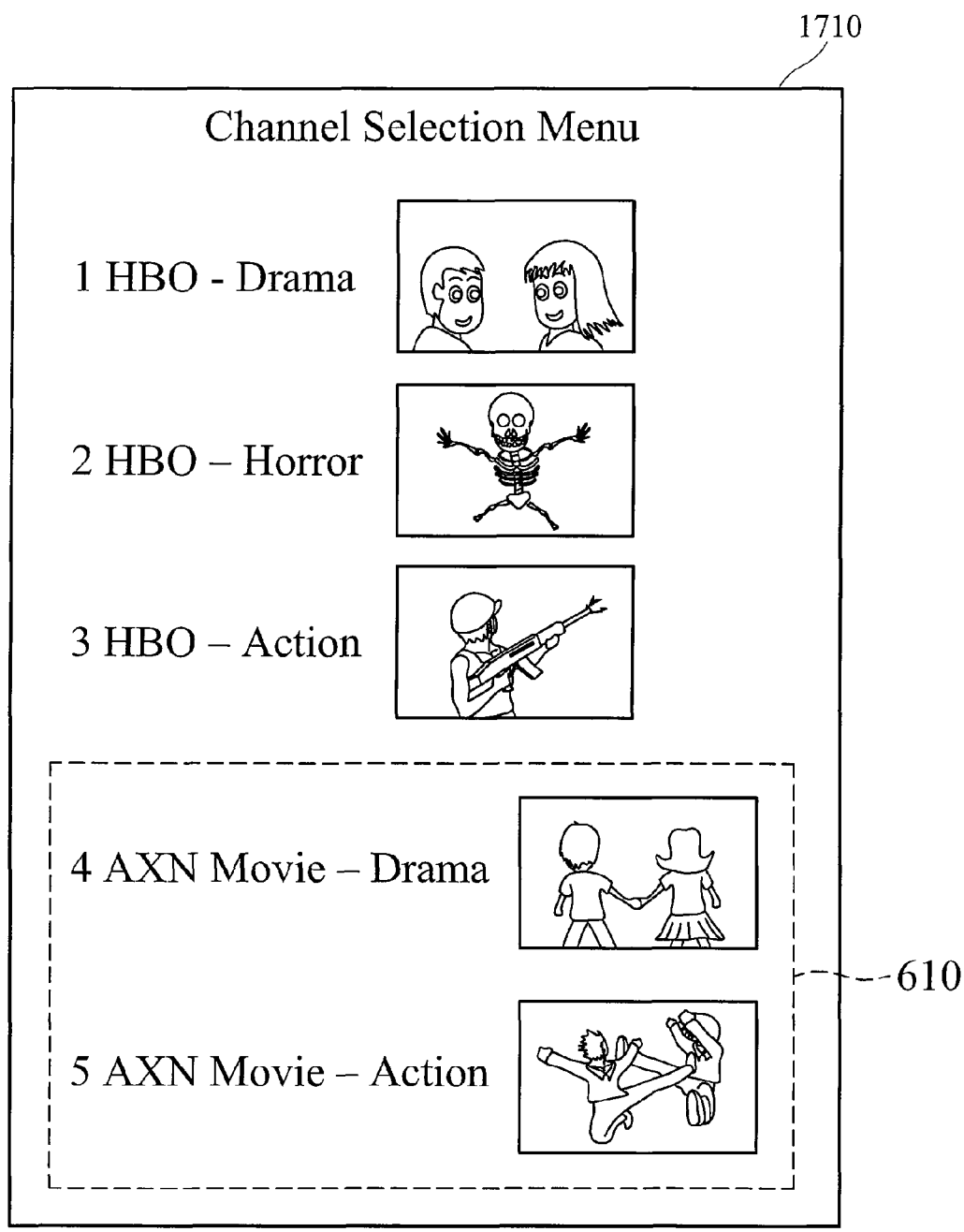
FIG. 6a is another exemplary channel selection menu in a top-down list displayed on a display device.

In step S3510, newly acquired channel names, representative images, video frames, and/or others, are inserted into a channel selection menu displayed on the display device 1710 (FIG. 1) to facilitate browsing, selection, and playing of the newly detected programs with reference to the channel selection menu. FIG. 5a is an exemplary channel selection menu in a top-down list displayed on the display device 1710. FIG. 5b is an exemplary channel selection menu in a grid matrix displayed on the display device 1710. Each list item of the top-down list or each cell of the grid matrix comprises a serial number and a channel name acquired by step S3130. Two list items 510 and two cells 530 represent newly inserted programs. FIG. 6a is another exemplary channel selection menu in a top-down list displayed on the display device 1710. FIG. 6b is another exemplary channel selection menu in a grid matrix displayed on the display device 1710. Each list item of the top-down list or each cell of the grid matrix comprises a serial number, a channel name acquired by step S3130, and a representative image or representative video frames acquired by step S3310. Two list items 610 and two cells 630 represent newly inserted programs. It is to be understood that user can easier recognize the content of a program by browsing representative image or video frames than the channel name.

Figure 3B:
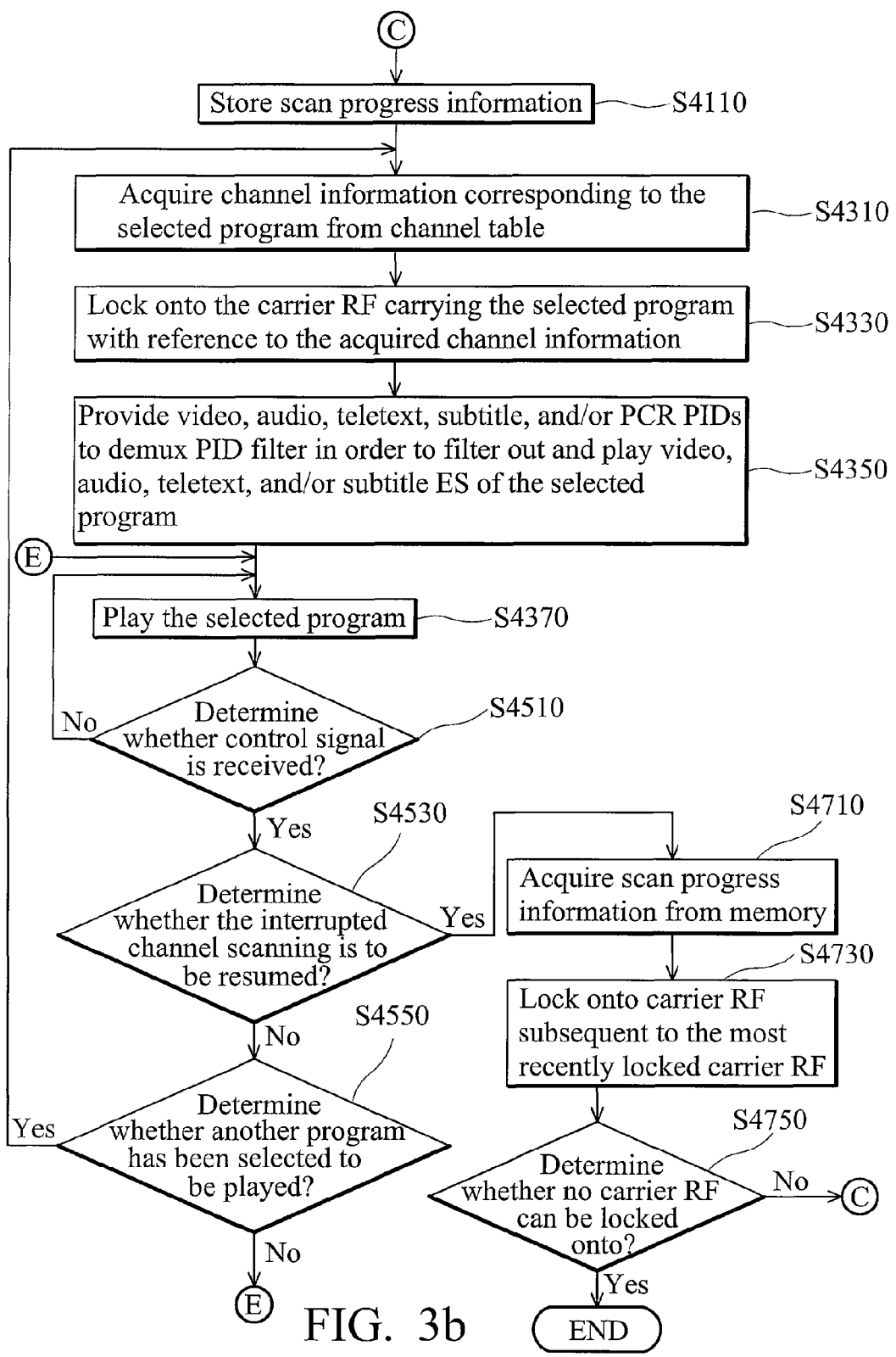

In step S3710, it is determined whether a program has been selected to be played. If so, a program play process as shown in FIG. 3b is executed, otherwise, the procedure goes back to step S3110 to lock onto the next carrier RF to acquire further channel information. Note that the channel scanning method and a menu management method comprising multiple menu operations, such as browsing menu items or grid cells, entering a selected program and others, may be executed in a multitasking environment, thus, the channel scanning method and the menu management method can communicate with each other via an event passing mechanism. Specifically, when a menu operation of entering a selected program is detected, the UI manager triggers a relevant event to interrupt channel scanning, so the selected program can be played.

FIG. 3b is a flowchart illustrating a channel scanning process, executed by the processing unit 1110 (FIG. 1). The embodiment of the channel scanning method periodically locks on to a carrier RF and provides video, audio, teletext, subtitle, and/or PCR PIDs to the dumux PID filter 1330 of FIG. 1 according to channel information stored in the channel table in order to play selected programs. In addition, the channel scanning method periodically detects whether the interrupted channel scanning is to be resumed when receiving a control signal via a remote control receiver (not shown) or a control panel (not shown) of the channel scanning system 10 of FIG. 1. If so, the selected program stops playing, and scan progress information regarding the most recently locked carrier RF, the most recently stored program, and/or others is acquired, a carrier RF subsequent to the most recently locked carrier RF is then locked onto to resume the channel scanning as shown in FIG. 3a. In step S4110, scan progress information regarding the most recently locked carrier RF, the most recently stored program, and/or others, is stored in the memory 1130 of FIG. 1. In step S4310, channel information corresponding to the selected program is acquired from the channel table (referred to Table. 4). In step S4330, the carrier RF carrying the selected program is locked onto with reference to the acquired channel information. In step S4350, video, audio, teletext, subtitle, and/or PCR PIDs are provided to the demux PID filter 1330 of FIG. 1 with reference to the acquired channel information in order to filter out and play video, audio, teletext, and/or subtitle ES of the selected program. In step S4370, the selected program is played.

In step S4510, it is determined whether a control signal is received. If so, the process proceeds to step S4530, otherwise, to step S4370. The control signal may be received via a remote control receiver (not shown) or a control panel (not shown) of the channel scanning system 10 of FIG. 1. In step S4530, it is determined whether the interrupted channel scanning is to be resumed. If so, the process proceeds to step S4710, otherwise, to step S4550. For example, the interrupted channel scanning is resumed when the control signal is a channel scanning resume signal, or a channel switching signal for switching to the next program not yet detected by the previous channel scanning process (i.e. no channel information for the program to be switched can be found in the channel table). In step S4550, it is determined whether another program has been selected to be played. If so, the process proceeds to step S4310, otherwise, to step S4510 to wait for another control signal. In step S4710, the scan progress information is acquired from the memory 1130 of FIG. 1. In step S4730, a carrier RF subsequent to the most recently locked carrier RF is locked onto with reference to the acquired scan progress information. In step S4750, it is determined whether no carrier RF can be locked onto. If so, the process ends, otherwise, the process proceeds to step S3130 as shown in FIG. 3a.

Channel scanning methods, or certain aspects or portions thereof, may take the form of program codes (i.e., instructions) embodied in tangible media, such as floppy diskettes, CD-ROMS, hard drives, or any other machine-readable storage medium, wherein, when the program codes are loaded into and executed by a machine, such as a computer, the machine becomes an apparatus for practicing the invention. The disclosed methods may also be embodied in the form of program codes transmitted over some transmission medium, such as electrical wiring or cabling, through fiber optics, or via any other form of transmission, wherein, when the program codes are received and loaded into and executed by a machine, such as a computer, the machine becomes an apparatus for practicing the invention. When implemented on a general-purpose processor, the program codes combine with the processor to provide a unique apparatus that operate analogously to specific logic circuits.

Certain terms are used throughout the description and claims to refer to particular system components. As one skilled in the art will appreciate, consumer electronic equipment manufacturers may refer to a component by different names. This disclosure does not intend to distinguish between components that differ in name but not function.

Although the invention has been described in terms of preferred embodiment, it is not limited thereto. Those skilled in this technology can make various alterations and modifications without departing from the scope and spirit of the invention. Therefore, the scope of the invention shall be defined and protected by the following claims and their equivalents.

What is claimed is:

1. A channel scanning method, comprising:
   storing scan progress information when interrupting a channel scanning process;
   locking onto a carrier RF according to the most recently processed carrier RF with reference to the stored scan progress information when resuming the interrupted channel scanning process;
   acquiring channel information of a first channel carried by the locked carrier RF; and
   storing the acquired channel information of the first channel in a channel table.

2. The method as claimed in claim 1 wherein the channel information of the first channel comprises a representative image or a series of representative video frames acquired from the locked carrier RF.

3. The method as claimed in claim 1 further comprising:
   acquiring a channel name of the first channel from a service description table (SDT) of a transport stream (TS) carried by the locked carrier RF;
   acquiring a packet identifier (PID) identifying a video, audio, teletext or subtitle elementary stream (ES) of the first channel from a program map table (PMT) carried by the locked carrier RF; and
   storing the acquired channel name and PID identifying the video, audio, teletext or subtitle ES of the first channel in the channel table,
   wherein the service description table describes programs in a digital video broadcasting (DVB) system.

4. The method as claimed in claim 3 further comprising:
   acquiring a PID of the PMT from a program association table (PAT) of the TS carried by the locked carrier RF; and
   filtering out a TS packet with the PID of the PMT from the TS carried by the locked carrier RF in order to acquire the PMT.

5. The method as claimed in claim 1 further comprising:
   acquiring a packet identifier (PID) identifying a video elementary stream (ES) of the first channel from a program map table (PMT) carried by the locked carrier RF;
   filtering out TS packets with the acquired PID of the video ES from the TS carried by the locked carrier RF in order to acquire a representative image or a series of representative video frames of the first channel; and
   storing the representative image or video frames of the first channel in the channel table.

6. The method as claimed in claim 5 wherein the acquired representative image or video frames of the first channel are inserted into a channel selection menu displayed on a display device, facilitating browsing, selection, and play of the first channel with reference to the channel selection menu.

7. The method as claimed in claim 1 wherein the scan progress information comprises the most recently locked carrier RF or the most recently channel stored in the channel table.

8. The method as claimed in claim 1 wherein the channel table initially stores channel information of a second channel, the method further comprising:
   storing the scan progress information when detecting the second channel has been selected to be played; and
   playing a program in the second channel according to the channel information of the second channel.

9. A system with a channel scanning function comprising:
   a memory device;
   a tuner and demodulator;
   a demux packet identifier (PID) filter; and
   a processing unit, coupling to the memory device, the tuner and demodulator and the demux PID filter, storing scan progress information in the memory device when interrupting a channel scanning process, controlling the tuner and demodulator to lock onto a carrier radio frequency (RF) according to the most recently processed carrier RF with reference to the stored scan progress information when resuming the interrupted channel scanning process, acquiring channel information of a first channel carried by the locked carrier RF, and storing the acquired channel information of the first channel in a channel table of the memory device.

10. The system as claimed in claim 9 wherein the channel information of the first channel comprises a representative image or a series of representative video frames acquired from the locked carrier RF.

11. The system as claimed in claim 9 wherein the processing unit acquires a channel name of the first channel from a service description table (SDT) of a transport stream (TS) carried by the locked carrier RF, acquires a packet identifier (PID) identifying a video, audio, teletext or subtitle elementary stream (ES) of the first program from a program map table (PMT) carried by the locked carrier RF, and stores the acquired channel name and PID identifying the video, audio, teletext or subtitle ES of the first channel in the channel table, and the service description table describes programs in a digital video broadcasting (DVB) system.

12. The system as claimed in claim 11 wherein the processing unit acquires a PID of the PMT from a program association table (PAT) of the TS carried by the locked carrier RF, and directs the demux PID filter to filter out a TS packet with the PID of the PMT from the TS carried by the locked carrier RF in order to acquire the PMT.

13. The system as claimed in claim 9 wherein the processing unit acquires a packet identifier (PID) identifying a video elementary stream (ES) of the first program from a program map table (PMT) carried by the locked carrier RF, directs the demux PID filter to filter out at least one TS packet with the acquired PID of the video ES from the TS carried by the locked carrier RF in order to acquire a representative image or a series of representative video frames of the first program, and stores the representative image or video frames of the first channel in the channel table.

14. The system as claimed in claim 13 wherein the acquired representative image or video frames of the first channel are inserted into a channel selection menu displayed on a display device, facilitating browsing, selection, and play of the first channel with reference to the channel selection menu.

15. The system as claimed in claim 9 wherein the scan progress information regarding the most recently locked carrier RF or the most recently channel stored in the channel table.

16. The system as claimed in claim 9 wherein the channel table initially stores channel information of a second channel, and the processing unit stores the scan progress information when detecting the second channel has been selected to be played, and plays the second channel according to the channel information of the second channel.

17. A system for channel display comprising:
- a memory device;
- a tuner and demodulator; and
- a processing unit, coupling to the memory device and the tuner and demodulator, acquiring a representative image or a series of representative video frames of a channel from a transport stream (TS) carried by a locked carrier RF, and storing the representative image or video frames of the channel in a channel table of the memory device.

18. The system as claimed in claim 17 further comprising a demux packet identifier (PID) filter, wherein the processing unit acquires a packet identifier (PID) identifying a video elementary stream (ES) of the channel carried by the locked carrier RF, and directs the PID filter to filter out at least one TS packet with the acquired PID of the video ES from the TS carried by the locked carrier RF in order to acquire the representative image or the series of representative video frames of the channel.

19. The system as claimed in claim 17 wherein the processing unit inserts the acquired representative image or video frames of the channel into a channel selection menu displayed on a display device, facilitating browsing, selection, and play of the channel with reference to the channel selection menu.

* * * * *